US007194856B2

(12) United States Patent
Ma et al.

(10) Patent No.: US 7,194,856 B2
(45) Date of Patent: Mar. 27, 2007

(54) HYDRAULIC SYSTEM HAVING IMV RIDE CONTROL CONFIGURATION

(75) Inventors: Pengfei Ma, Naperville, IL (US); Aleksandar M. Egelja, Naperville, IL (US); Mikhail A. Sorokine, Naperville, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 0 days.

(21) Appl. No.: 11/139,687

(22) Filed: May 31, 2005

(65) Prior Publication Data

US 2006/0266027 A1 Nov. 30, 2006

(51) Int. Cl.
*F16D 31/02* (2006.01)
*F15B 21/04* (2006.01)

(52) U.S. Cl. .......................................... 60/418; 60/469

(58) Field of Classification Search .................. 60/413, 60/417, 418, 469
See application file for complete search history.

(56) References Cited

U.S. PATENT DOCUMENTS

| | | | |
|---|---|---|---|
| 3,366,202 | A | 1/1968 | James |
| 4,046,270 | A | 9/1977 | Baron et al. |
| 4,222,409 | A | 9/1980 | Budzich |
| 4,250,794 | A | 2/1981 | Haak et al. |
| 4,416,187 | A | 11/1983 | Nystrom |
| 4,437,385 | A | 3/1984 | Kramer et al. |
| 4,480,527 | A | 11/1984 | Lonnemo |
| 4,581,893 | A | 4/1986 | Lindbom |
| 4,586,330 | A | 5/1986 | Watanabe et al. |
| 4,619,186 | A | 10/1986 | Walters |
| 4,623,118 | A | 11/1986 | Kumar |
| 4,662,601 | A | 5/1987 | Andersson |
| 4,706,932 | A | 11/1987 | Yoshida et al. |
| 4,747,335 | A | 5/1988 | Budzich |
| 4,799,420 | A | 1/1989 | Budzich |
| 5,067,519 | A | 11/1991 | Russell et al. |
| 5,137,254 | A | 8/1992 | Aardema et al. |
| 5,147,172 | A | 9/1992 | Hossieni |
| 5,152,142 | A | 10/1992 | Budzich |
| 5,211,196 | A | 5/1993 | Schwelm |
| 5,249,421 | A | 10/1993 | Lunzman |
| 5,267,441 | A | 12/1993 | Devier et al. |
| 5,287,794 | A | 2/1994 | Andersson |
| 5,297,381 | A | 3/1994 | Eich et al. |
| 5,305,681 | A | 4/1994 | Devier et al. |
| 5,313,873 | A | 5/1994 | Gall et al. |
| 5,350,152 | A | 9/1994 | Hutchison et al. |
| 5,366,202 | A | 11/1994 | Lunzman |
| 5,447,093 | A | 9/1995 | Budzich |
| 5,477,677 | A | 12/1995 | Krnavek |
| 5,490,384 | A | 2/1996 | Lunzman |
| 5,520,499 | A | 5/1996 | Ufheil et al. |
| 5,537,818 | A | 7/1996 | Hosseini et al. |
| 5,540,049 | A | 7/1996 | Lunzman |
| 5,553,452 | A | 9/1996 | Snow et al. |
| 5,560,387 | A | 10/1996 | Devier et al. |
| 5,564,673 | A | 10/1996 | Pieren |
| 5,568,759 | A | 10/1996 | Aardema |
| 5,678,470 | A | 10/1997 | Koehler et al. |
| 5,692,376 | A | 12/1997 | Miki et al. |
| 5,701,933 | A | 12/1997 | Lunzman |
| 5,733,095 | A | 3/1998 | Palmer et al. |
| 5,737,993 | A | 4/1998 | Cobo et al. |
| 5,784,945 | A | 7/1998 | Krone et al. |
| 5,813,226 | A | 9/1998 | Krone |
| 5,813,309 | A | 9/1998 | Taka et al. |
| 5,857,330 | A | 1/1999 | Ishizaki et al. |
| 5,868,059 | A | 2/1999 | Smith |
| 5,878,647 | A | 3/1999 | Wilke et al. |
| 5,880,957 | A | 3/1999 | Aardema et al. |
| 5,890,362 | A | 4/1999 | Wilke |
| 5,897,287 | A | 4/1999 | Berger et al. |
| 5,947,140 | A | 9/1999 | Aardema et al. |
| 5,953,977 | A | 9/1999 | Krishna et al. |
| 5,960,695 | A | 10/1999 | Aardema et al. |
| 6,009,708 | A | 1/2000 | Miki et al. |
| 6,026,730 | A | 2/2000 | Yoshida et al. |
| 6,082,106 | A | 7/2000 | Hamamoto |
| 6,185,493 | B1 | 2/2001 | Skinner et al. |
| 6,216,456 | B1 | 4/2001 | Mitchell |
| 6,257,118 | B1 | 7/2001 | Wilbur et al. |
| 6,282,891 | B1 | 9/2001 | Rockwood |
| 6,321,534 | B1 | 11/2001 | A'Hearn et al. |

(Continued)

FOREIGN PATENT DOCUMENTS

EP 0967400 B1 12/1999

(Continued)

*Primary Examiner*—Thomas E. Lazo
(74) *Attorney, Agent, or Firm*—Finnegan, Henderson, Farabow, Garrett & Dunner

(57) ABSTRACT

A hydraulic control system for a work machine is disclosed. The hydraulic control system has a source of pressurized fluid and at least one actuator having a first and a second chamber. The hydraulic control system also has a first independent metering valve disposed between the source and the first chamber, and a second independent metering valve disposed between the reservoir and the second chamber. The first and second independent metering valves each have a valve element movable from a flow blocking to a flow passing position to facilitate movement of the at least one actuator. The hydraulic control system further has an accumulator and a third independent metering valve disposed in parallel with the first independent metering valve and between the accumulator and the first chamber. The third independent metering valve is configured to selectively communicate the accumulator with the first chamber to cushion movement of the at least one actuator.

30 Claims, 2 Drawing Sheets

U.S. PATENT DOCUMENTS

| | | | |
|---|---|---|---|
| 6,357,230 | B1 | 3/2002 | A'Hearn et al. |
| 6,367,365 | B1 | 4/2002 | Weickert et al. |
| 6,398,182 | B1 | 6/2002 | Stephenson |
| 6,446,433 | B1 | 9/2002 | Holt et al. |
| 6,467,264 | B1 | 10/2002 | Stephenson et al. |
| 6,498,973 | B2 | 12/2002 | Dix et al. |
| 6,502,393 | B1 | 1/2003 | Stephenson et al. |
| 6,502,500 | B2 | 1/2003 | Yoshino |
| 6,516,614 | B1 | 2/2003 | Knoll |
| 6,598,391 | B2 | 7/2003 | Lunzman et al. |
| 6,619,183 | B2 | 9/2003 | Yoshino |
| 6,655,136 | B2 | 12/2003 | Holt et al. |
| 6,662,705 | B2 | 12/2003 | Huang et al. |
| 6,691,603 | B2 | 2/2004 | Linerode et al. |
| 6,694,860 | B2 | 2/2004 | Yoshino |
| 6,705,079 | B1 | 3/2004 | Tabor et al. |
| 6,715,402 | B2 | 4/2004 | Pfaff et al. |
| 6,718,759 | B1 | 4/2004 | Tabor |
| 6,725,131 | B2 | 4/2004 | Lunzman |
| 6,732,512 | B2 | 5/2004 | Pfaff et al. |
| 6,748,738 | B2 | 6/2004 | Smith |
| 6,761,029 | B2 | 7/2004 | Linerode |
| 6,880,332 | B2 | 4/2005 | Pfaff et al. |
| 2003/0084946 | A1 | 5/2003 | Douglass et al. |
| 2003/0115863 | A1 | 6/2003 | Holt et al. |
| 2003/0121256 | A1 | 7/2003 | Mather |
| 2003/0121409 | A1 | 7/2003 | Lunzman et al. |
| 2003/0125840 | A1 | 7/2003 | Lunzman et al. |
| 2003/0196545 | A1 | 10/2003 | Jensen et al. |
| 2004/0055288 | A1 | 3/2004 | Pfaff et al. |
| 2004/0055289 | A1 | 3/2004 | Pfaff et al. |
| 2004/0055452 | A1 | 3/2004 | Tabor |
| 2004/0055453 | A1 | 3/2004 | Tabor |
| 2004/0055454 | A1 | 3/2004 | Pfaff et al. |
| 2004/0055455 | A1 | 3/2004 | Tabor et al. |
| 2004/0060430 | A1 | 4/2004 | Brinkman |

FOREIGN PATENT DOCUMENTS

| | | |
|---|---|---|
| EP | 1186783 | 3/2002 |
| JP | 02613041 B2 | 5/1997 |

HYDRAULIC SYSTEM HAVING IMV RIDE CONTROL CONFIGURATION

TECHNICAL FIELD

The present disclosure relates generally to a hydraulic system, and more particularly, to a hydraulic system having an IMV Ride Control configuration.

BACKGROUND

Work machines such as, for example, dozers, loaders, excavators, motor graders, and other types of heavy machinery use hydraulic actuators coupled to a work implement for manipulation of a load. Such work machines generally do not include shock absorbing systems and thus may pitch, lope, or bounce upon encountering uneven or rough terrain. The substantial inertia of the work implement and associated load may tend to exacerbate these movements resulting in increased wear of the work machine and discomfort for the operator.

One method of reducing the magnitude of the movements attributable to the work implement and associated load is described in U.S. Pat. No. 5,733,095 (the '095 patent) issued to Palmer et al. on Mar. 31, 1998. The '095 patent describes a work machine with a ride control system having a three-way solenoid-actuated directional control valve connected to move a hydraulic actuator in response to movements of a control lever, and a ride control arrangement. The ride control arrangement includes a valve mechanism associated with the hydraulic actuator and an accumulator. The valve mechanism includes a first valve and a second valve. The first valve is movable to selectively control fluid flow from the hydraulic actuator to the accumulator or to a reservoir. The second valve is controlled to move the first valve, thereby providing ride control. When the first valve is moved to communicate fluid from the hydraulic actuator to the accumulator, movement of a work implement connected to the hydraulic actuator is cushioned by flow between the hydraulic actuator and the accumulator. Consequently, the force of a load associated with the work implement is prevented from transference to a frame of the work machine to cause a jolt thereto and subsequently to wheels of the work machine, which could cause the work machine to lope or bounce.

Although the ride control system of the '095 patent may reduce some undesired movements of the work machine, it may be complex, expensive, and lack precision and responsiveness. In particular, because the '095 patent uses different types of valves to actuate the hydraulic actuator and to provide ride control, the system may be complex to control and expensive to build and maintain. Further, because the directional control valve is a three-position valve that controls both a filling function and a draining function associated with the hydraulic actuator, it may be costly and difficult to precisely tune.

The disclosed hydraulic system is directed to overcoming one or more of the problems set forth above.

SUMMARY OF THE INVENTION

In one aspect, the present disclosure is directed to a hydraulic control system for a work machine. The hydraulic control system includes a reservoir configured to hold a supply of fluid, a source configured to pressurize the fluid, and at least one actuator having a first chamber and a second chamber. The hydraulic control system also includes a first independent metering valve disposed between the source and the first chamber and a second independent metering valve disposed between the reservoir and the second chamber. The first independent metering valve has a valve element movable from a flow blocking position to a flow passing position to facilitate movement of the at least one actuator in a first direction. The second independent metering valve has a valve element movable from a flow blocking position to a flow passing position to facilitate movement of the at least one actuator in the first direction. The hydraulic control system also includes an accumulator and a third independent metering valve disposed in parallel with the first independent metering valve and between the accumulator and the first chamber. The third independent metering valve is configured to selectively communicate the accumulator with the first chamber to cushion movement of the at least one actuator.

In another aspect, the present disclosure is directed to a method of controlling a hydraulic system. The method includes pressurizing a supply of fluid and moving a first valve element of a first independent metering valve from a flow blocking position to a flow passing position to direct the pressurized fluid to a first chamber of an actuator, thereby facilitating movement of the actuator in a first direction. The method further includes moving a second valve element of a second independent metering valve from a flow blocking position to a flow passing position to drain fluid from a second chamber of the actuator, thereby facilitating movement of the actuator in the first direction. The method additionally includes moving a third valve element of a third independent metering valve from a flow blocking position to a flow passing position to direct pressurized fluid between the first chamber and an accumulator, thereby cushioning movement of the actuator.

DETAILED DESCRIPTION

Figure 1:
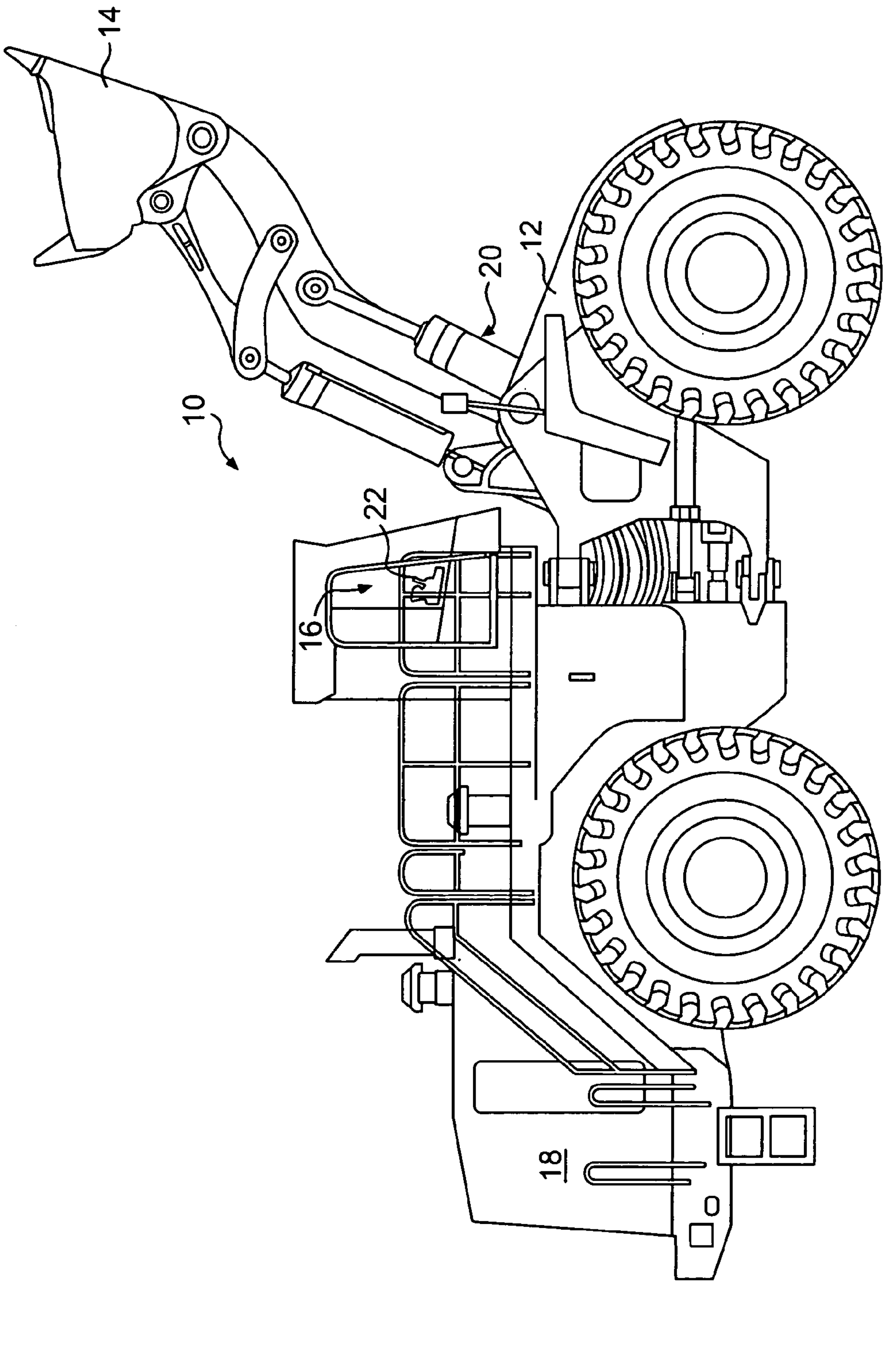
FIG. 1 is a side-view diagrammatic illustration of an exemplary disclosed work machine.

FIG. 1 illustrates an exemplary work machine 10. Work machine 10 may be a mobile machine that performs some type of operation associated with an industry such as mining, construction, farming, transportation, or any other industry known in the art. For example, work machine 10 may be an earth moving machine such as a loader, a dozer, an excavator, a backhoe, a motor grader, a dump truck, or any other earth moving machine. Work machine 10 may include a frame 12, a work implement 14 movably attachable to work machine 10, an operator interface 16, a power source 18, and one or more hydraulic actuators 20.

Frame 12 may include any structural member that supports movement of work machine 10 and work implement 14. Frame 12 may embody, for example, a stationary base frame connecting power source 18 to work implement 14, a movable frame member of a linkage system, or any other structural member known in the art.

Numerous different work implements 14 may be attachable to a single work machine 10 and controllable via operator interface 16. Work implement 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Work implement 14 may be connected to work machine 10 via a direct pivot, via a linkage system, or in any other appropriate manner. Work implement 14 may be configured to pivot, rotate, slide, swing, lift, or move relative to work machine 10 in any manner known in the art.

Operator interface 16 may be configured to receive input from a work machine operator indicative of a desired work implement movement. Specifically, operator interface 16 may include an operator interface device 22.

Operator interface device 22 may embody, for example, a single- or multi-axis joystick located to one side of an operator station. Operator interface device 22 may be a proportional-type controller configured to position and/or orient work implement 14. It is contemplated that additional and/or different operator interface devices may be included within operator interface 16 such as, for example, wheels, knobs, push-pull devices, switches, buttons, pedals, and other operator interface devices known in the art.

Power source 18 may be an engine such as, for example, a diesel engine, a gasoline engine, a gaseous fuel-powered engine such as a natural gas engine, or any other type of engine known in the art. It is contemplated that power source 18 may alternatively embody another source of power such as a fuel cell, a power storage device, an electric or hydraulic motor, or another source of power known in the art.

Figure 2:
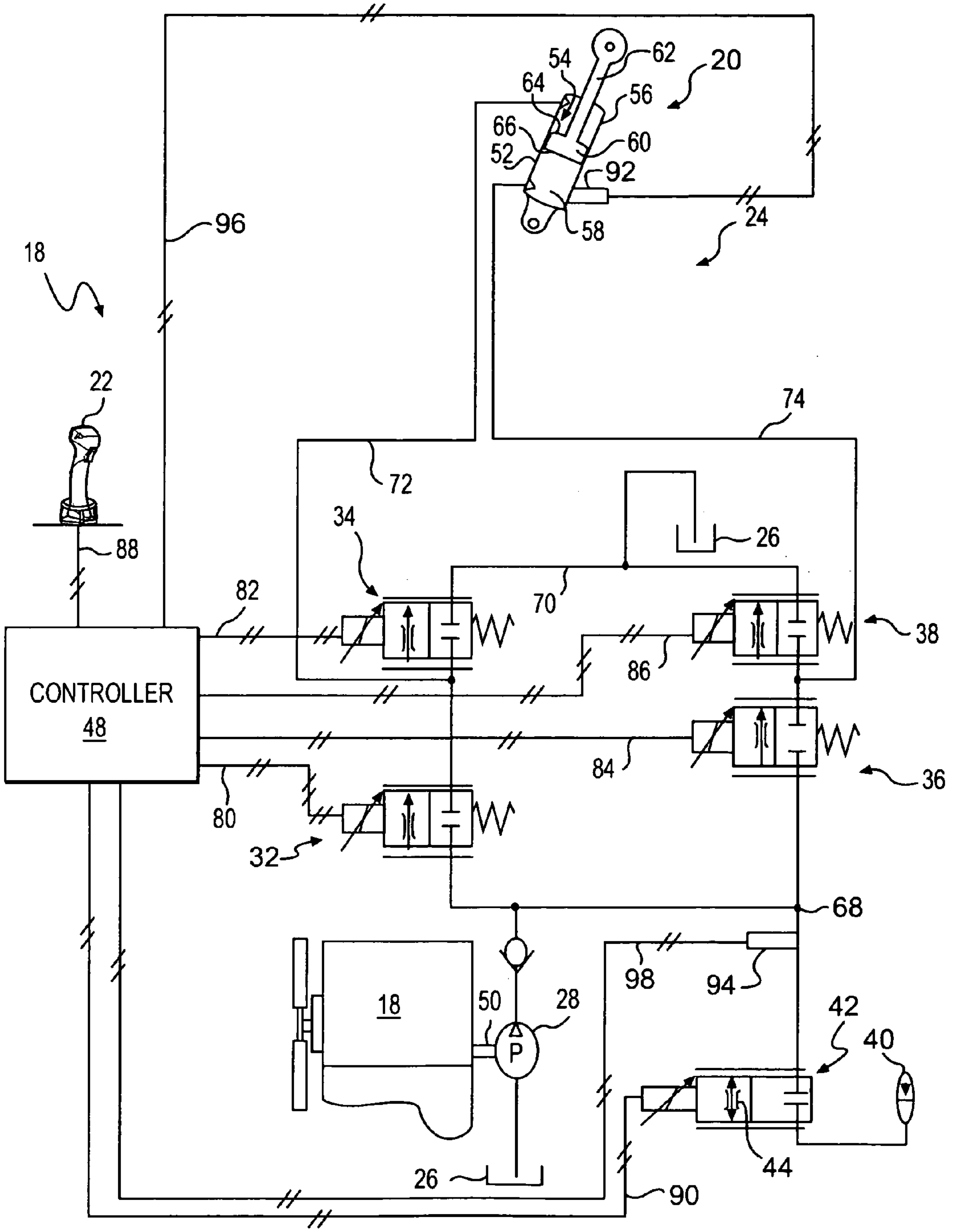
FIG. 2 is a schematic illustration of an exemplary disclosed hydraulic control system for the work machine of FIG. 1.

As illustrated in FIG. 2, work machine 10 may include a hydraulic control system 24 having a plurality of fluid components that cooperate together to move work implement 14. Specifically, hydraulic control system 24 may include a tank 26 holding a supply of fluid, and a source 28 configured to pressurize the fluid and to direct the pressurized fluid to hydraulic actuator 20.

Hydraulic control system 24 may also include a rod end supply valve 32, a rod end drain valve 34, a head end supply valve 36, a head end drain valve 38, an accumulator 40, and an accumulator valve 42. Hydraulic control system 24 may further include a controller 48 in communication with the fluid components of hydraulic control system 24. It is contemplated that hydraulic control system 24 may include additional and/or different components such as, for example, check valves, pressure relief valves, makeup valves, pressure-balancing passageways, and other components known in the art.

Tank 26 may constitute a reservoir configured to hold a supply of fluid. The fluid may include, for example, a dedicated hydraulic oil, an engine lubrication oil, a transmission lubrication oil, or any other fluid known in the art.

One or more hydraulic systems within work machine 10 may draw fluid from and return fluid to tank 26. It is also contemplated that hydraulic control system 24 may be connected to multiple separate fluid tanks.

Source 28 may be configured to produce a flow of pressurized fluid and may embody a pump such as, for example, a variable displacement pump, a fixed displacement variable delivery pump, a fixed displacement fixed delivery pump, or any other suitable source of pressurized fluid. Source 28 may be drivably connected to power source 18 of work machine 10 by, for example, a countershaft 50, a belt (not shown), an electrical circuit (not shown), or in any other appropriate manner. Alternatively, source 28 may be indirectly connected to power source 18 via a torque converter, a gear box, or in any other manner known in the art.

It is contemplated that multiple sources of pressurized fluid may be interconnected to supply pressurized fluid to hydraulic control system 24.

Hydraulic actuator 20 may embody a fluid cylinder that connects work implement 14 to frame 12 via a direct pivot, via a linkage system with hydraulic actuator 20 being a member in the linkage system (referring to FIG. 1), or in any other appropriate manner. It is contemplated that a hydraulic actuator other than a fluid cylinder may alternatively be implemented within hydraulic control system 24 such as, for example, a hydraulic motor or another appropriate hydraulic actuator. As illustrated in FIG. 2, hydraulic actuator 20 may include a tube 52 and a piston assembly 54 disposed within tube 52. One of tube 52 and piston assembly 54 may be pivotally connected to frame 12, while the other of tube 52 and piston assembly 54 may be pivotally connected to work implement 14. It is contemplated that tube 52 and/or piston assembly 54 may alternatively be fixedly connected to either frame 12 or work implement 14. Hydraulic actuator 20 may include a rod chamber 56 and a head chamber 58 separated by a piston 60. Rod and head chambers 56, 58 may be selectively supplied with pressurized fluid from source 28 and selectively connected with tank 26 to cause piston assembly 54 to displace within tube 52, thereby changing the effective length of hydraulic actuator 20. The expansion and retraction of hydraulic actuator 20 may function to assist in moving work implement 14.

Piston assembly 54 may include piston 60 being axially aligned with and disposed within tube 52, and a piston rod 62 connectable to one of frame 12 and work implement 14 (referring to FIG. 1). Piston 60 may include a first hydraulic surface 64 and a second hydraulic surface 66 opposite first hydraulic surface 64. An imbalance of force caused by fluid pressure on first and second hydraulic surfaces 64, 66 may result in movement of piston assembly 54 within tube 52. For example, a force on first hydraulic surface 64 being greater than a force on second hydraulic surface 66 may cause piston assembly 54 to retract within tube 52 to decrease the effective length of hydraulic actuator 20. Similarly, when a force on second hydraulic surface 66 is greater than a force on first hydraulic surface 64, piston assembly 54 will displace and increase the effective length of hydraulic actuator 20. A flow rate of fluid into and out of rod and head chambers 56 and 58 may determine a velocity of hydraulic actuator 20, while a pressure of the fluid in contact with first and second hydraulic surfaces 64 and 66 may determine an actuation force of hydraulic actuator 20. A sealing member (not shown), such as an o-ring, may be connected to piston 60 to restrict a flow of fluid between an internal wall of tube 52 and an outer cylindrical surface of piston 60.

Rod end supply valve 32 may be disposed between source 28 and rod chamber 56 and configured to regulate a flow of pressurized fluid to rod chamber 56 in response to a command velocity from controller 48. Specifically, rod end supply valve 32 may be an independent metering valve (IMV) having a proportional spring-biased valve element that is solenoid actuated and configured to move between a first position at which fluid flow is blocked from rod chamber 56 and a second position at which fluid is allowed to flow into rod chamber 56. The valve element of rod end supply valve 32 may be movable to any position between the first and second positions to vary the rate of flow into rod chamber 56, thereby affecting the velocity of hydraulic actuator 20. It is contemplated that rod end supply valve 32 may be configured to allow fluid from rod chamber 56 to flow through rod end supply valve 32 during a regeneration event when a pressure within rod chamber 56 exceeds a pressure directed from source 28 to rod end supply valve 32.

Rod end drain valve 34 may be disposed between rod chamber 56 and tank 26 and configured to regulate a flow of fluid from rod chamber 56 to tank 26 in response to the command velocity from controller 48. Specifically, rod end drain valve 34 may be an IMV having a proportional spring-biased valve element that is solenoid actuated and configured to move between a first position at which fluid is blocked from flowing from rod chamber 56 and a second position at which fluid is allowed to flow from rod chamber 56. The valve element of rod end drain valve 34 may be movable to any position between the first and second positions to vary the rate of flow from rod chamber 56, thereby affecting the velocity of hydraulic actuator 20.

Head end supply valve 36 may be disposed between source 28 and head chamber 58 and configured to regulate a flow of pressurized fluid to head chamber 58 in response to the command velocity from controller 48. Specifically, head end supply valve 36 may be an IMV having a proportional spring-biased valve element configured to move between a first position at which fluid is blocked from head chamber 58 and a second position at which fluid is allowed to flow into head chamber 58. The valve element of head end supply valve 36 may be movable to any position between the first and second positions to vary the rate of flow into head chamber 58, thereby affecting the velocity of hydraulic actuator 20. It is further contemplated that head end supply valve 36 may be configured to allow fluid from head chamber 58 to flow through head end supply valve 36 during a regeneration event when a pressure within head chamber 58 exceeds a pressure directed to head end supply valve 36 from source 28 or during a ride control mode.

Head end drain valve 38 may be disposed between head chamber 58 and tank 26 and configured to regulate a flow of fluid from head chamber 58 to tank 26 in response to a command velocity from controller 48. Specifically, head end drain valve 38 may be an IMV having a proportional spring-biased valve element configured to move between a first position at which fluid is blocked from flowing from head chamber 58 and a second position at which fluid is allowed to flow from head chamber 58. The valve element of head end drain valve 38 may be movable to any position between the first and second positions to vary the rate of flow from head chamber 58, thereby affecting the velocity of hydraulic actuator 20.

Accumulator 40 may be selectively communicated with head chamber 58 by way of accumulator valve 42 to selectively receive pressurized fluid from and direct pressurized fluid to hydraulic cylinder 20. In particular, accumulator 40 may be a pressure vessel filled with a compressible gas and configured to store pressurized fluid for future use as a source of fluid power. The compressible gas may include, for example, nitrogen or another appropriate compressible gas. As fluid within head chamber 58 exceeds a predetermined pressure while accumulator valve 42 and head end supply valve 36 are in a flow passing condition, fluid from head chamber 58 may flow into accumulator 40. Because the nitrogen gas is compressible, it may act like a spring and compress as the fluid flows into accumulator 40. When the pressure of the fluid within head chamber 58 then drops below a predetermined pressure while accumulator valve 42 and head end supply valve 36 are in the flow passing condition, the compressed nitrogen within accumulator 40 may urge the fluid from within accumulator 40 back into head chamber 58.

To smooth out pressure oscillations within hydraulic cylinder 20, the hydraulic system 24 may absorb some energy from the fluid as the fluid flows between head chamber 58 and accumulator 40. The damping mechanism that accomplishes this may include a restrictive orifice 44 disposed within either accumulator valve 42, or within a fluid passageway between accumulator 40 and head chamber 58. Each time work implement 14 moves in response to uneven terrain, fluid may be squeezed through restrictive orifice 44. The energy expended to force the oil through restrictive orifice 44 may be converted into heat, which may be dissipated from hydraulic system 24. This dissipation of energy from the fluid essentially absorbs the bouncing energy, making for a smoother ride of work machine 10.

Accumulator valve 42 may be disposed in parallel with head end supply valve 36 and between accumulator 40 and head chamber 58. Accumulator valve 42 may be configured to regulate a flow of pressurized fluid between accumulator 40 and head chamber 58 in response to a command velocity from controller 48. Specifically, accumulator valve 42 may be an IMV having a proportional spring-biased valve element configured to move between a first position at which fluid is blocked from flowing between head chamber 58 and accumulator 40, and a second position at which fluid is allowed to flow between head chamber 58 and accumulator 40. When in ride control mode, it is contemplated that instead of a fixed restrictive orifice 44, the valve element of accumulator valve 42 may be controllably moved to any position between the flow passing and the flow blocking position to vary the restriction and associated rate of fluid between head chamber 58 and accumulator 40, thereby affecting the cushioning of hydraulic actuator 20 during travel of work machine 10. It is further contemplated that, when in an operational mode other than ride control mode, accumulator valve 42 may be further configured to supply fluid to head chamber 58 for intended movements of hydraulic actuator 20, when source 28 has insufficient capacity to produce a desired velocity of hydraulic actuator 20.

Rod and head end supply and drain valves 32–38 and accumulator valve 42 may be fluidly interconnected. In particular, rod and head end supply valves 32, 36 may be connected in parallel to a common supply passageway 68 extending from source 28. Rod and head end drain valves 34, 38 may be connected in parallel to a common drain passageway 70 leading to tank 26. Rod end supply and drain valves 32, 34 may be connected to a common rod chamber passageway 72 for selectively supplying and draining rod chamber 56 in response to velocity commands from controller 48. Head end supply and drain valves 36, 38 and accumulator valve 42 may be connected to a common head chamber passageway 74 for selectively supplying and draining head chamber 58 in response to the velocity commands from controller 48.

Controller 48 may embody a single microprocessor or multiple microprocessors that include a means for controlling an operation of hydraulic control system 24. Numerous commercially available microprocessors can be configured to perform the functions of controller 48. It should be appreciated that controller 48 could readily embody a general work machine microprocessor capable of controlling numerous work machine functions. Controller 48 may include a memory, a secondary storage device, a processor, and any other components for running an application. Various other circuits may be associated with controller 48 such as power supply circuitry, signal conditioning circuitry, solenoid driver circuitry, and other types of circuitry.

One or more maps relating interface device position and command velocity information for hydraulic actuator 20 may be stored in the memory of controller 48. Each of these maps may be in the form of a table, a map, an equation, or in another suitable form. The relationship maps may be automatically or manually selected and/or modified by controller 48 to affect actuation of hydraulic actuator 20.

Controller 48 may be configured to receive input from operator interface device 22 and to command a velocity for hydraulic actuator 20 in response to the input. Specifically, controller 48 may be in communication with rod and head end supply and drain valves 32–38 of hydraulic actuator 20 via communication lines 80–86 respectively, with operator interface device 22 via a communication line 88, and with accumulator valve 42 via a communication line 90. Controller 48 may receive the interface device position signal from operator interface device 22 and reference the selected and/or modified relationship maps stored in the memory of controller 48 to determine command velocity values.

These velocity values may then be commanded of hydraulic actuator 20 causing rod and head end supply and drain valves 32–38 and/or accumulator valve 42 to selectively fill or drain rod and head chambers 56 and 58 associated with hydraulic actuator 20 to produce the desired work implement velocity.

Controller 48 may also be configured to initiate a ride control mode. In particular, controller 48 may either be manually switched to ride control mode or may automatically enter ride control mode in response to one or more inputs. For example, a button, switch, or other operator control device (not shown) may be associated with operator station 16 that, when manually engaged by a work machine operator, causes controller 48 to enter the ride control mode. Conversely, controller 48 may receive input indicative of a travel speed of work machine 10, a loading condition of work machine 10, a position or orientation of work implement 14, or other such input, and automatically enter the ride control mode. When in ride control mode, controller 48 may cause the valve elements of rod end supply valve 32 and head end drain valve 38 to move to or remain in the flow blocking positions. Controller 48 may then move the valve elements of rod end drain valve 34, head end supply valve 36, and accumulator valve 42 to the flow passing position. As described above, accumulator valve 42 may be moved to the flow passing position to allow fluid to flow between head chamber 58 and accumulator 40 for absorption of energy from the fluid each time the fluid passes through restrictive orifice 44. Head end supply valve 36 may be moved to the flow passing position to allow fluid flow between accumulator valve 42 and head chamber 58. Rod end drain valve 34 may be moved to the flow passing position to prevent hydraulic lock during an up-bounce of work implement 14 as fluid is flowing from accumulator 40 into head chamber 58. It is also contemplated that the valve elements of rod end drain valve 34 and head end supply valve 36 may be selectively positioned between the flow passing and flow blocking positions to vary the restriction of the fluid exiting and/or entering head and rod chambers 56 and 58, thereby increasing dampening during ride control mode.

One or more sensors 92, 94 may be associated with controller 48 to facilitate precise pressure control of the fluid within accumulator 40. Pressure sensor 92 may be located to monitor the pressure of fluid within head chamber 58, while sensor 94 may be located to monitor the pressure of fluid entering accumulator 40. Sensors 92 and 94 may be in communication with controller 48 by way of communication lines 96 and 98, respectively. To minimize undesired movement of work implement 14 upon initiation of the ride control mode, the pressure of the fluid within accumulator 40 may be substantially matched to the pressure within head chamber 58. The pressure within accumulator 40 may be varied by moving accumulator valve 42 to the flow passing position and selectively moving head end supply and drain valves 32, 34 between the flow passing and blocking positions, and/or by operating source 28. Head end supply and drain valves 32, 34 may be selectively moved in response to a pressure differential between the fluids monitored by sensors 92 and 94 to drain accumulator 40 while source 28 may be selectively operated to fill accumulator 40, thereby substantially balancing the pressures of the fluid within accumulator 40 and head chamber 58.

INDUSTRIAL APPLICABILITY

The disclosed hydraulic control system may be applicable to any work machine that includes a hydraulic actuator connected to a work implement.

The disclosed hydraulic control system may improve ride control of the work machine by minimizing undesired movements of the work machine that are attributable to inertia of the work implement and an associated load. The operation of hydraulic control system 24 will now be explained.

During operation of work machine 10, a work machine operator may manipulate operator interface device 22 to create a movement of work implement 14. The actuation position of operator interface device 22 may be related to an operator expected or desired velocity of work implement 14. Operator interface device 22 may generate a position signal indicative of the operator expected or desired velocity and send this position signal to controller 48.

Controller 48 may be configured to determine a command velocity for hydraulic actuator 20 that results in the operator expected or desired velocity. Specifically, controller 48 may be configured to receive the operator interface device position signal and to compare the operator interface device position signal to the relationship map stored in the memory of controller 48 to determine an appropriate velocity command signal. Controller 48 may then send the command signal to rod and head end supply and drain valves 32–38 to regulate the flow of pressurized fluid into and out of rod and head chambers 56, 58, thereby causing movement of hydraulic actuator 20 that substantially matches the operator expected or desired velocity.

In some situations, such as during an operational mode other than ride control, the flow of pressurized fluid from source 28 may be insufficient to extend hydraulic actuator 20 at the operator-desired velocity. In these situations, controller 48 may move the valve elements of accumulator valve 42 and head end supply valve 36 to the flow passing position to allow pressurized fluid to flow from accumulator 40 to head chamber 58.

Accumulator 40 may also be used during ride control mode. Specifically, when controller 48 either automatically enters or is manually caused to enter ride control mode, controller 48 may move the valve elements of rod end supply valve 32 and head end drain valve 38 to the flow blocking position (or retain them in the flow blocking position if already in the flow blocking position) and move the valve elements of accumulator valve 42, head end supply valve 36, and rod end drain valve 34 to the flow passing position. When in ride control mode, fluid may be allowed to drain from rod chamber 56 and flow into and out of head chamber 58. As fluid both leaves rod chamber 56 and flows into and out of head chamber 58, bounce energy may be absorbed as the fluid flow is restricted.

The pressure of fluid within accumulator 40 and head chamber 58 may be substantially balanced before fluid is allowed to flow between accumulator 40 and head chamber 58 during ride control mode. In particular, if the fluids within accumulator 40 and head chamber 58 are not substantially balanced prior to the direction of fluid between accumulator 40 and head chamber 58, work implement 14 may move undesirably upon initiation of ride control mode. For example, if the pressure of the fluid within accumulator 40 exceeds the pressure of the fluid within head chamber 58, upon moving the valve elements of head end supply valve 36 and accumulator valve 42 to the flow passing positions to initiate ride control mode operation, the fluid within accumulator 40 may flow into head chamber 58 and raise work implement 14. Conversely, if the pressure of the fluid within head chamber 58 exceeds the pressure of the fluid within accumulator 40, upon moving the valve elements of head end supply valve 36 and accumulator valve 42 to the flow passing positions, the fluid within head chamber 58 may flow into accumulator 40 causing work implement 14 to drop.

The pressure of the fluid within accumulator 40 and head chamber 58 may be balanced by selectively moving the valve elements of rod end supply and drain valves 32, 34 between the flow passing and flow blocking positions, and/or by operating source 28. For example, if a reduction of the pressure of the fluid within accumulator 40 is desired, the valve elements of both rod end and supply and drain valves 32, 34 may be moved to the flow passing position to allow fluid from accumulator 40 to flow through rod end supply and drain valves 32, 34 to tank 26. Similarly, if an increase in the pressure of the fluid within accumulator 40 is desired, the valve elements of rod and head end supply valves 32, 36 may be moved to the flow blocking position and then source 28 caused to produce a flow of pressurized fluid. When the valve elements of both of head and rod end supply valves 32, 36 are in the flow blocking position and source 28 is creating a flow of pressurized fluid, the flow may be forced into accumulator 40, thereby increasing the pressure of the fluid within.

Because hydraulic control system 24 may utilize five substantially identical independent metering valves, the cost and complexity of hydraulic control system may be low. In particular, because of the commonality of the IMVs, the cost to build and service hydraulic control system 24 be low compared to a system having different types of control valves. For example the cost to produce a single type of valve, to stock a single type of valve, to train a technician to assemble or service a single type of valve, and other associated costs may be much less than those costs associated with a system having multiple valve types. In addition, because the IMVs are substantially identical, the control strategies governing operation of the IMVs may also be similar, potentially resulting in less software related expense and complexity.

In addition, because the IMVs are only two position valves, the cost of the IMVs may be low. Specifically, a valve having more than two positions requires additional machining processes and material, which increases the base price of the IMV. In addition, the difficulty of precisely tuning a valve having more than two positions increases at a rate proportional to the number of positions.

It will be apparent to those skilled in the art that various modifications and variations can be made to the disclosed hydraulic control system. Other embodiments will be apparent to those skilled in the art from consideration of the specification and practice of the disclosed hydraulic control system. For example, hydraulic cylinder 20 may be differently oriented such that accumulator 40 and accumulator valve 42 are more appropriately associated with rod chamber 56 rather than head chamber 58 for effective use during ride control mode. In addition, accumulator 40 and accumulator valve 42 may be associated with multiple hydraulic actuators 20 and/or multiple hydraulic circuits. It is intended that the specification and examples be considered as exemplary only, with a true scope being indicated by the following claims and their equivalents.

What is claimed is:

1. A hydraulic control system for a work machine, comprising:

a reservoir configured to hold a supply of fluid;

a source configured to pressurize the fluid;

at least one actuator having a first chamber and a second chamber;

a first independent metering valve disposed between the source and the first chamber, the first independent metering valve having a valve element movable between a flow blocking position and a flow passing position to facilitate movement of the at least one actuator in a first direction;

a second independent metering valve disposed between the reservoir and the second chamber, the second independent metering valve having a valve element movable between a flow blocking position and a flow passing position to facilitate movement of the at least one actuator in the first direction;

an accumulator;

a third independent metering valve disposed in parallel with the first independent metering valve and between the accumulator and the first chamber, the third independent metering valve configured to selectively communicate the accumulator with the first chamber to cushion movement of the at least one actuator;

a fourth independent metering valve disposed between the first chamber and the reservoir, the fourth independent metering valve having a valve element movable between a flow blocking position and a flow gassing position to facilitate movement of the at least one actuator in a second direction;

a fifth independent metering valve disposed between the second chamber and the source, the fifth independent metering valve having a valve element movable between a flow blocking position and a flow gassing position to facilitate movement of the at least one actuator in the second direction; and a controller in communication with each of the first, second, third, fourth, and fifth independent metering valves, the controller being configured to control the second, third, and fifth independent metering valves to substantially balance pressures of the fluid in the first chamber and the accumulator.

2. The hydraulic control system of claim 1, wherein the first independent metering valve is in the flow passing position when the third independent metering valve communicates the accumulator with the first chamber.

3. The hydraulic control system of claim 2, wherein the second independent metering valve is in the flow passing position when the third independent metering valve communicates the accumulator with the first chamber.

4. The hydraulic control system of claim 1, wherein the first, second, and third independent metering valves are substantially identical.

5. The hydraulic control system of claim 1, wherein the first, second, third, fourth, and fifth independent metering valves are substantially identical.

6. The hydraulic control system of claim 1, further including:

a common first chamber passageway connecting the first, third, and fourth independent metering valves to the first chamber; and a common second chamber passageway connecting the second and fifth independent metering valves to the second chamber.

7. The hydraulic control system of claim 1, wherein each of the first, second, third, fourth, and fifth independent metering valves are actuated, in response to signals from the controller.

8. The hydraulic control system of claim 1, further including:

a first sensor configured to sense a pressure of the fluid within the first chamber; and a second sensor configured to sense a pressure of the fluid within the accumulator, wherein the controller is configured to selectively move the valve elements of the second, third, and fifth independent metering valves between the flow passing and blocking positions in response to a difference between the sensed pressures to substantially balance the pressures of the fluid in the first chamber and the accumulator.

9. The hydraulic control system of claim 8, wherein the pressures of the fluid in the first chamber and the accumulator are substantially balanced prior to the direction of pressurized fluid between the first chamber and the accumulator.

10. The hydraulic control system of claim 1, wherein the at least one actuator is a hydraulic cylinder.

11. The hydraulic control system of claim 1, wherein the third independent metering valve is further configured to selectively communicate the accumulator with the first chamber when a pressure supplied by the source is insufficient to provide a desired movement of the at least one actuator in the first direction.

12. A method of controlling a hydraulic system, comprising:

pressurizing a supply of fluid;

moving a first valve element of a first independent metering valve between a flow blocking position and a flow passing position to direct the pressurized fluid to a first chamber of an actuator, thereby facilitating movement of the actuator in a first direction;

moving a second valve element of a second independent metering valve between a flow blocking position and a flow passing position to drain fluid from a second chamber of the actuator, thereby facilitating movement of the actuator in the first direction;

moving a third valve element of a third independent metering valve between a flow blocking position and a flow passing position to direct pressurized fluid between the first chamber and an accumulator, thereby cushioning movement of the actuator moving a fourth valve element of a fourth independent metering valve between a flow blocking position and a flow passing position to drain fluid from the first chamber of the actuator, thereby facilitating movement of the actuator in a second direction;

moving a fifth valve element of a fifth independent metering valve between a flow blocking position and a flow passing position to direct pressurized fluid to the second chamber of the actuator, thereby facilitating movement of the actuator in the second direction; and selectively moving the second, third, and fifth valve elements to substantially balance the pressures of the fluid in the first chamber and the accumulator.

13. The method of claim 12, wherein movement of the third valve element from the flow blocking position is initiated when the first valve element is in the flow passing position.

14. The method of claim 12, wherein the first, second, and third independent metering valves are substantially identical.

15. The method of claim 12, wherein the first, second, third, fourth, and fifth independent metering valves are substantially identical.

16. The method of claim 12, further including:

directing fluid between the first chamber and the first, third, and fourth independent metering valves by way of a common first chamber passageway; and directing fluid between the second chamber and the second and fifth independent metering valves by way of the common second chamber passageway.

17. The method of claim 12, further including directing signals from a controller to each of the first, second, third, fourth, and fifth independent metering valves to selectively move the first, second, third, fourth, and fifth valve elements between the flow passing and flow blocking positions.

18. The method of claim 12, further including:

sensing a pressure of the fluid within the first chamber;

sensing a pressure of the fluid within the accumulator; and wherein the second, third, and fifth valve elements are selectively moved in response to a difference between the sensed pressures to substantially balance the pressures of the fluid in the first chamber and the accumulator.

19. The method of claim 18, wherein the pressures of the fluid in the first chamber and the accumulator are substantially balanced prior to the direction of pressurized fluid between the first chamber and the accumulator.

20. The method of claim 12, wherein the actuator is a hydraulic cylinder.

21. The method of claim 12, further including selectively communicating the accumulator with the first chamber when a pressure supplied by the source is insufficient to provide a desired movement of the actuator in the first direction.

22. A work machine, comprising:

a power source;

a work implement;

a frame operatively connecting the power source and the work implement;

a reservoir configured to hold a supply of fluid;

a pump driven by the power source to pressurize the fluid;

at least one hydraulic cylinder connected between the frame and the work implement and having a first chamber and a second chamber, the first and second chambers selectively filled with and drained of the pressurized fluid to move the work implement;

a first independent metering valve disposed between the source and the first chamber, the first independent metering valve having a valve element movable between a flow blocking position and a flow passing position to facilitate movement of the at least one hydraulic cylinder in a first direction;

a second independent metering valve disposed between the reservoir and the second chamber, the second independent metering valve having a valve element movable between a flow blocking position and a flow passing position to facilitate movement of the at least one hydraulic cylinder in the first direction;

an accumulator; and a third independent metering valve disposed in parallel with the first independent metering valve and between the accumulator and the first chamber, the third independent metering valve configured to selectively communicate the accumulator with the first chamber to cushion movement of the at least one hydraulic cylinder, the third independent metering valve further configured to selectively communicate the accumulator with the first chamber when a pressure supplied by the source is insufficient to provide a desired movement of the at least one actuator in the first direction.

23. The work machine of claim 22, wherein the first and second independent metering valves are both in the flow passing position when the third independent metering valve communicates the accumulator with the first chamber.

24. The work machine of claim 22, wherein the first, second, and third independent metering valves are substantially identical.

25. The work machine of claim 22, further including:

a fourth independent metering valve disposed between the first chamber and the reservoir, the fourth independent metering valve having a valve element movable between a flow blocking position and a flow passing position to facilitate movement of the at least one hydraulic cylinder in a second direction; and a fifth independent metering valve disposed between the second chamber and the source, the fifth independent metering valve having a valve element movable between a flow blocking position and a flow passing position to facilitate movement of the at least one hydraulic cylinder in the second direction.

26. The work machine of claim 25, wherein the first, second, third, fourth, and fifth independent metering valves are substantially identical.

27. The work machine of claim 25, further including:

a common first chamber passageway connecting the first, third, and fourth independent metering valves to the first chamber; and a common second chamber passageway connecting the second and fifth independent metering valves to the second chamber.

28. The work machine of claim 25, further including a controller in communication with each of the first, second, third, fourth, and fifth independent metering valves.

29. The work machine of claim 28, wherein each of the first, second, third, fourth, and fifth independent metering valves are actuated in response to signals from the controller.

30. The work machine of claim 22, further including:

a first sensor configured to sense a pressure of the fluid within the first chamber; and a second sensor configured to sense a pressure of the fluid within the accumulator, wherein the controller is configured to selectively move the valve elements of the second, third, and fifth independent metering valves between the flow passing and blocking positions in response to a difference between the sensed pressures to substantially balance the pressures of the fluid in the first chamber and the accumulator prior to the direction of pressurized fluid between the first chamber and the accumulator.

* * * * *